United States Patent [19]

Donguy

[11] Patent Number: 4,967,599

[45] Date of Patent: Nov. 6, 1990

[54] MECHANICAL AND INSULATING CONNECTION BETWEEN A NOZZLE AND THE FILAMENT-WOUND CASING OF THE COMBUSTION CHAMBER OF A SOLID PROPELLANT ROCKET MOTOR

[75] Inventor: Paul Donguy, Bruges, France

[73] Assignee: Societe Europeenne De Propulsion, Puteaux, France

[21] Appl. No.: 576,127

[22] Filed: Feb. 2, 1984

Related U.S. Application Data

[63] Continuation-in-part of Ser. No. 265,103, May 18, 1981, abandoned.

[51] Int. Cl.$^5$ .............................................. F02K 1/00
[52] U.S. Cl. .................................... 60/271; 60/904
[58] Field of Search .................. 60/271, 266, 909; 239/265.11, 265.19, DIG. 19

[56] References Cited

U.S. PATENT DOCUMENTS

| | | | |
|---|---|---|---|
| 2,481,059 | 9/1949 | Africano | 239/265.25 |
| 2,952,876 | 9/1960 | Miles | 60/253 X |
| 2,956,334 | 10/1960 | Stewart | 60/909 X |
| 2,989,844 | 6/1961 | Alden et al. | 60/255 X |
| 2,995,011 | 8/1961 | Kimmel | 60/271 |
| 3,027,709 | 4/1962 | Welder | 60/271 X |
| 3,048,970 | 8/1962 | Herzog . | |
| 3,191,379 | 6/1965 | Pierce | 60/271 X |
| 3,212,257 | 10/1965 | Frey et al. | 60/271 |
| 3,228,186 | 1/1966 | Allen . | |
| 3,344,603 | 10/1967 | Iwanciow | 60/271 X |
| 3,613,374 | 10/1971 | Ritchey | 60/271 X |
| 3,648,461 | 3/1972 | Bailey et al. | 60/266 X |
| 3,659,423 | 5/1972 | Lair et al. | 239/265.19 X |
| 3,729,935 | 5/1973 | Fletcher et al. | 60/254 X |
| 3,795,106 | 3/1974 | Cherry et al. | 60/909 X |
| 4,168,337 | 9/1979 | Maistre | 428/113 |
| 4,180,211 | 12/1979 | Olcott et al. | 60/909 X |
| 4,219,597 | 8/1980 | Maistre | 428/105 |
| 4,254,599 | 3/1981 | Maistre | 52/224 |
| 4,348,957 | 9/1982 | White et al. | 60/271 X |

FOREIGN PATENT DOCUMENTS

| | | | |
|---|---|---|---|
| 2848114 | 5/1979 | Fed. Rep. of Germany | 60/271 |
| 951237 | 3/1964 | United Kingdom . | |

Primary Examiner—Carlton R. Croyle
Assistant Examiner—T. S. Thorpe
Attorney, Agent, or Firm—Marshall & Melhorn

[57] ABSTRACT

The present invention relates to a mechanical and insulating connection between, on the one hand, a filament-wound casing, constituting a wall for the combustion chamber of a solid propellant rocket motor, and on the other hand, a hot nozzle made from a heat-conducting refractory material wherein said connection consists of a single connecting ring fixed to the nozzle and resiliently connected to the wound casing, which ring is made from a low density insulating material, resistant to mechanical forces, as well as to mechanical shocks and thermal stresses, preferably a composite material with multidirectional reinforcements and a ceramic matrix.

4 Claims, 1 Drawing Sheet

MECHANICAL AND INSULATING CONNECTION BETWEEN A NOZZLE AND THE FILAMENT-WOUND CASING OF THE COMBUSTION CHAMBER OF A SOLID PROPELLANT ROCKET MOTOR

This application is a continuation in part of Ser. No. 06/265,103, now abandoned, filed 5/18/81.

BACKGROUND OF THE INVENTION

The present invention relates to a filament-wound combustion chamber for a solid propellant rocket motor, this chamber comprising at its aft opening connection means intended to allow direct mounting of a hot-throughout nozzle made from heat-conducting refractory composite materials.

It is now currently known to produce the combustion chamber of a solid propellant rocket motor by winding glass, Kevlar or carbon fibers, coated with a thermosetting resin, generally an epoxy resin and protected from the heat, on the inside, by a heat-protecting layer in elastomer. In order to establish the connection of the nozzle to the combustion chamber, a metal polar boss (or adapter) is typically used.

The nozzle is equipped with a metallic flange permitting the connection with the metal polar boss of the combustion chamber by means of screws, of a encircling ring or any other adequate means.

To reduce the overall weight, the present trend is to produce hot-throughout nozzles in one or a plurality of components made from a heat-conducting refractory materials of the carbon-carbon type. However, such nozzles need to be insulated against heat at the level of the metallic flange, because the wound portion of the combustion chamber can only withstand very limited heating, about 100° C. This implies a relatively complex design of the nozzle. According to a conventional construction (such as the nozzle of the European MAGE 2 Apogee Motor, for example), the connection of the nozzle with the metal polar boss of the combustion chamber is made by means of a titanium flange surrounded by insulative carbon/phenolic parts (reference numerals 9 and 10 on FIG. 1), blocked on the nozzle by means of a screwed check nut made from a heat-conducting refractory carbon-carbon material.

This assembly of components shows a certain complexity resulting in high production and assembly costs. In addition, the weight of the various components, constituting the combustion chamber and the nozzle, and in particular the metal components, i.e. the aft polar boss of the combustion chamber, the nozzle flange and attaching means (screw, ring, etc.), restricts the possibility of reducing the weight of the rocket motor. Moreover, these metallic components make the rocket motor more likely to be detected by radar means.

The above-mentioned drawbacks, the constraints related to the forging of the metal parts, and their high cost price, have led to searching for new solutions particularly intended to lighten the combustion chamber-nozzle connection, these attempts not meeting with much success up to the present invention. The "Hercules" process described in French Patent No. 2251756 (corresponding to U.S. patent application Ser. No. 416,552 of Nov. 16, 1973) is particularly noted on this point. Said process consists in incorporating fibrous reinforcements in the wound portion of the combustion chamber, in order to be able to connect the nozzle directly to this chamber. Moreover, this process solves the problem only partially, since the nozzle still has to be thermally insulated from the combustion chamber.

SUMMARY OF THE INVENTION

The present invention has for its main object to overcome the aforesaid drawbacks by proposing a novel construction for the polar adapter of the wound combustion chamber, permitting direct connection to a hot-throughout nozzle without needing any intermediary insulation or mechanical connecting elements, and using no metallic components.

This object is reached by replacing the metal polar boss of the wound combustion chamber by a connection realized in a low density insulative material, capable of ensuring, under heat, the mechanical connection with a hot-throughout nozzle. Said nozzle is connected to the combustion chamber by threading means. The connection is in direct contact with the combustion gases on its internal side and thus plays locally a thermal protection part with respect to the wound portion of the combustion chamber.

By insulative material is meant according to the invention a material having a thermal diffusivity equal to or less than $5 \times 10^{-6} m^2 s^{-1}$; a low density material is a material having a density lower than 5. Mechanical strength under heat involves a resistance under circumferential traction greater that or equal to 50 MPa at 1000° C. A hot-throughout nozzle designates a nozzle having a temperature above 1000° C. at the end of the firing.

The example, an experimental solid propellent rocket motor having been sucessfully tested, exhibited the following characteristics:

| | |
|---|---|
| Combustion temperature | 3630° K. |
| Action time | 50s |
| Density of the connecting ring | 1,7 |
| Thermal Diffusivity of said ring | $2 \times 10^{-6} m^2 s^{-1}$ |
| Resistance under circumferential traction of said ring | 50 MPa |
| Temperature range in the area of the connecting screwing of the nozzle, at the end of the firing | 100–1800° C. |

The connection is made from a composite material with multidirectional reinforcements and a ceramic or carbon matrix. Such materials are described for example in U.S. Pat. Nos. 4,168,337; 4,254,599; 4,219,597 and 4,366,658 in the Applicant's name.

According to the techniques disclosed in the aforesaid documents, the reinforcements may be composed of alumina, silica or carbon fibers. Said fibers are arranged so as to form a multidirectional texture, for example by the regular criss-crossing of three, four, six or seven bundles. Such multidirectional texture can be obtained by a three-dimensional weaving, by construction with extruded rods of fiber bonded with an optionally fugitive resin, by winding the fibers onto rods, or by any other appropriate means.

Such multidirectional reinforcement texture is thereafter embedded in a matrix of silica, alumina or carbon. Said matrix can be obtained by dipping the reinforcement texture into a cement or by impregnation of a silicone resin which after curing will leave some silica, or else by impregnation of a furano resin which, after curing, will leave some carbon. These treatments may be repeated several times.

Amongst suitable materials, can be selected those of the silica-silica type (reinforcements in silica fibers and matrix in silica), of the alumina-alumina type, or of the alumina-carbon or carbon-alumina type. This list is not restrictive; in particular, the different components indicated above can be assembled in different manner. Zirconia based materials also appear to be interesting. The important point is that the selected materials meet the above-mentioned requirements of thermal insulation, mechanical strength under heat and low density.

In the above cited example, the connection was made from an alumina-carbon material, the reinforcing structure of which was obtained by the criss-crossing of six bundles, three reinforcement directions being providing by filament winding, and the other three by means of extruded rods.

BRIEF DESCRIPTION OF THE DRAWINGS

The invention will be more readily understood on reading the following description with reference to the accompanying drawings, in which.

Any identical reference numerals shown in different figures indicate identical elements.

DETAILED DESCRIPTION OF THE PREFERRED EMBODIMENT

Figure 1:
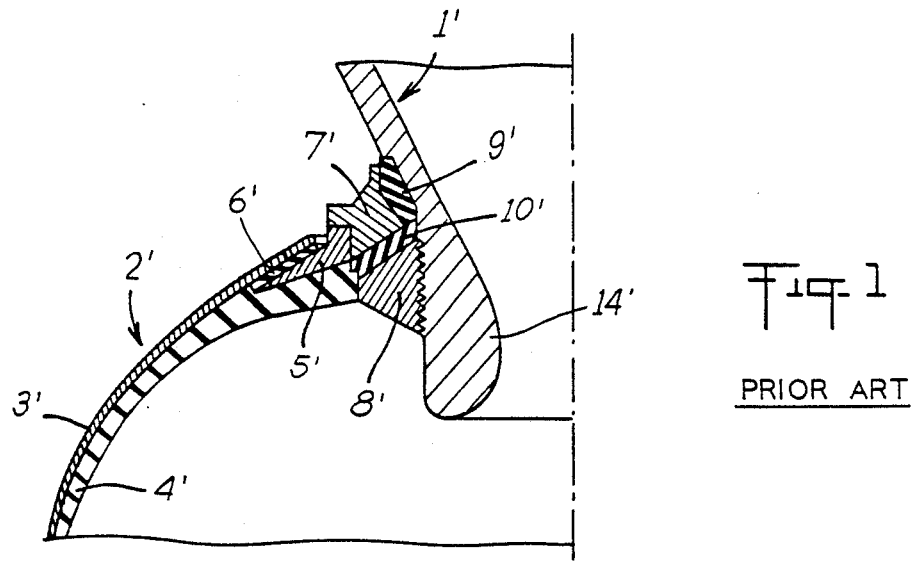
FIG. 1 is an axial cross-section showing half of the previously mentioned wound casing-nozzle connection according to the prior art.

FIG. 1 shows a filament-wound combustion chamber 2' and a nozzle assembly 1' according to the prior art. The nozzle assembly 1' is mounted on the filament-wound combustion chamber, generally indicated by reference numeral 2', which comprises an outer filament-wound casing 3', a metal polar boss 5', a layer 6' of adhesive material, and an elastomer layer 4' giving thermal protection against combustion gases to the outer filament-wound casing 3' and to the metal polar boss 5'. The polar boss 5' is connected to a metallic flanged attaching ring 7' of the nozzle assembly by means of screws, a ring, or any other adequate means. The nozzle assembly 1' comprises a portion 14' made from heat conducting carbon-carbon refractory materials, a metallic attaching ring 7', a refractory nut 8' also made from carbon-carbon refractory materials, and two carbon-phenolic insulative parts 9' and 10'.

Figure 2:
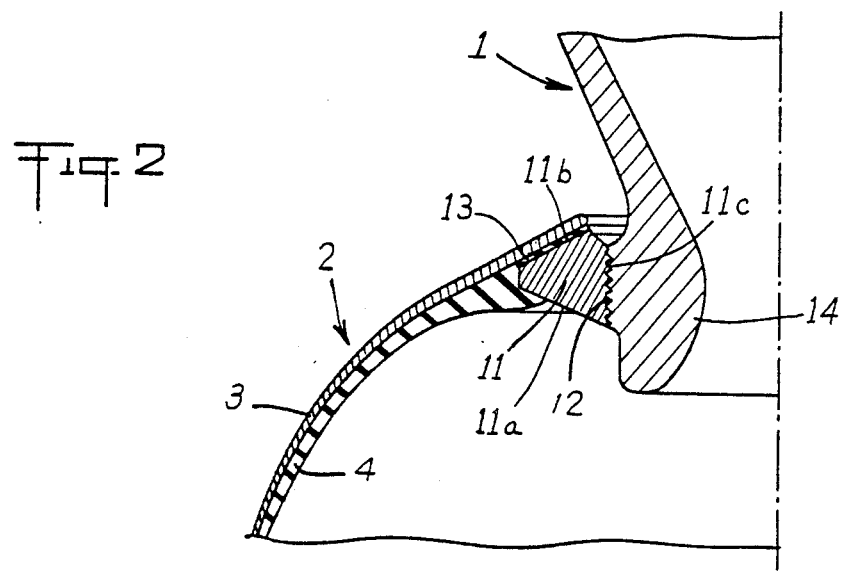
FIG. 2 is an axial cross-section showing half of a preferred embodiment of a wound casing-hot nozzle according to the invention.

FIG. 2 shows a hot nozzle 14 made from heat conducting refractory composite materials, of the carbon-carbon type for example, and a filament-wound casing assembly 2 including a mechanical and insulating connection according to the invention. The filament-wound casing assembly 2 comprises an outer filament-wound casing 3, an inner heat protective layer 4, a layer 13 of bonding material, and a mechanical and insulating connector 11 which is connected to the nozzle 14 by threading means 12. The inner heat protective layer 4 does not entirely cover the mechanical and insulating connector 11 which has a first annular surface 11a which is partially in direct contact with combustion gases having a temperature equal to or above 3000 degrees K and thus insures local thermal protection of the outer filament-wound casing 3.

Thus, the invention provides a unique mechanical and insulating connection which can be utilized to connect the hot nozzle 14 (where the termperature reaches 1000 to 1500° C.) to the outer filament-wound casing 3 (where the temperature is less than 100° C.). Moreover, a portion of the mechanical and insulating connector 11 is exposed to the heat of the combustion chamber (having a temperature of about 3500° C.). In the present invention, the mechanical and insulating connector 11 and the layer of bonding material 13 contacting a second annular surface 11b are the only components between the hot nozzle 14 and the outer filament-wound casing 3. The mechanical and insulating connector 11 is resistant to all mechanical forces as well as to mechanical shocks and thermal stresses.

On the hot nozzle side of the mechanical and insulating connector 11, there are provided means 12 positioned around the inner annular periphery of the mechanical and insulating connector 11 for securely attaching the connector 11 at a third annular surface 11c to the hot nozzle. These means are preferably threaded means.

On the outer filament-wound casing side of the mechanical and insulating connector 11, there is provided a layer 13 of bonding material (preferably an elastomer layer) which has no insulating part to play. It is only an adapation layer interposed between the facing surfaces of the outer filament-wound casing 2 and the mechanical and insulating connector 11 in order to accommodate any superficial unevenness in the facing surfaces which would otherwise prevent a firm bond therebetween. Indeed, if the two facing surfaces of the outer filament-wound casing 2 and of the mechanical and insulating connector 11 were perfectly mated, only a very thin layer of an adhering material would be necessary.

What is claimed is:

1. In a solid propellant rocket motor having a filament-wound casing assembly constituting a wall for a combustion chamber and a hot nozzle made from a heat conducting refractory material, the casing assembly including an outer filament-wound casing and an inner heat protective layer, a mechanical and insulating connection between the casing assembly and the nozzle, said connection comprising:

a single connecting ring formed from a low density insulating material having a sufficiently low heat conductivity for protecting the casing assembly from the heat of the nozzle, said connecting ring being substantially resistant to mechanical shocks and thermal stresses, said connecting ring including a first annular surface in facing relation to the combustion chamber, a second annular surface in facing relation to the inner surface of the outer casing adjacent an opening therein for receiving the nozzle, and a third annular surface in contact with an outer surface of the nozzle for connecting thereto; and a layer of bonding material interdigitated between the second annular surface of the connection ring and the facing inner surface of the outer casing for bonding said connecting ring directly to the casing assembly whereby said connecting ring and said layer of bonding material provide the sole mechanical connection between the outer casing and the nozzle to thereby militate against the transfer of heat energy.

2. The invention as claimed in claim 1 wherein said connecting ring is made from a composite material with multidirectional reinforcements embedded in a matrix.

3. The invention as claimed in claim 2 wherein said composite material is selected from at least one of silica, alumina, zirconia and carbon.

4. The invention as claimed in claim 3 wherein said connecting ring is securely attached to said nozzle by threading means.

* * * * *